(12) United States Patent
Klem

(10) Patent No.: US 6,325,011 B1
(45) Date of Patent: Dec. 4, 2001

(54) MULTIPLE-MODE WING-IN GROUND EFFECT VEHICLE

(75) Inventor: Richard Klem, Richmond, VA (US)

(73) Assignee: Klem Flying Boats, Richmond, VA (US)

(*) Notice: Subject to any disclaimer, the term of this patent is extended or adjusted under 35 U.S.C. 154(b) by 0 days.

(21) Appl. No.: 09/365,229

(22) Filed: Jul. 30, 1999

Related U.S. Application Data

(63) Continuation-in-part of application No. 08/802,774, filed on Feb. 21, 1997, now Pat. No. 5,950,559.
(60) Provisional application No. 60/012,222, filed on Feb. 23, 1996.

(51) Int. Cl.[7] .................................................. B63B 1/16
(52) U.S. Cl. .................................... 114/272; 244/12.1
(58) Field of Search ..................... 114/67 A, 271–275; 244/106, 12.1; 180/116, 124, 122

(56) References Cited

U.S. PATENT DOCUMENTS

| | | | |
|---|---|---|---|
| 1,301,917 | * | 4/1919 | De Bolotoff . |
| 3,117,545 | * | 1/1964 | Warner . |
| 4,151,893 | * | 5/1979 | Mantle . |
| 4,926,773 | * | 5/1990 | Manor ................................. 114/274 |
| 5,636,702 | * | 6/1997 | Kolacny ............................... 180/118 |

* cited by examiner

*Primary Examiner*—Jesus D. Sotelo
(74) *Attorney, Agent, or Firm*—Greenberg Traurig; Richard E. Kurtz

(57) ABSTRACT

A high-speed air-supported vehicle capable of multiple mode operations as both a water-contacting vehicle and an aircraft includes an aero roll-stabilizing plan form, a stabilizing ski/hydrofoil below a planing surface of a hull portion of the aero roll-stabilizing plan form for providing stabilization and lift to the plan form in at least one mode of operation, the ski/hydrofoil being mounted to a front underside of a hull portion of the aero roll-stabilizing plan form and being mounted forward of a center of gravity of the plan form, whereby a leading edge of said plan form is kept at a substantially constant level with respect to a surface of water during at least one mode of operation. A stabilizing ski provides stabilization and lift in at least one mode of operation. A flexible ski mount is provided for mounting the stabilizing ski to the aero roll stabilizing plan form. Trim flaps are provided for altering the direction of the plan form, and turning vanes are provided to reduce turbulence originating near the edge of the tip plates.

8 Claims, 20 Drawing Sheets

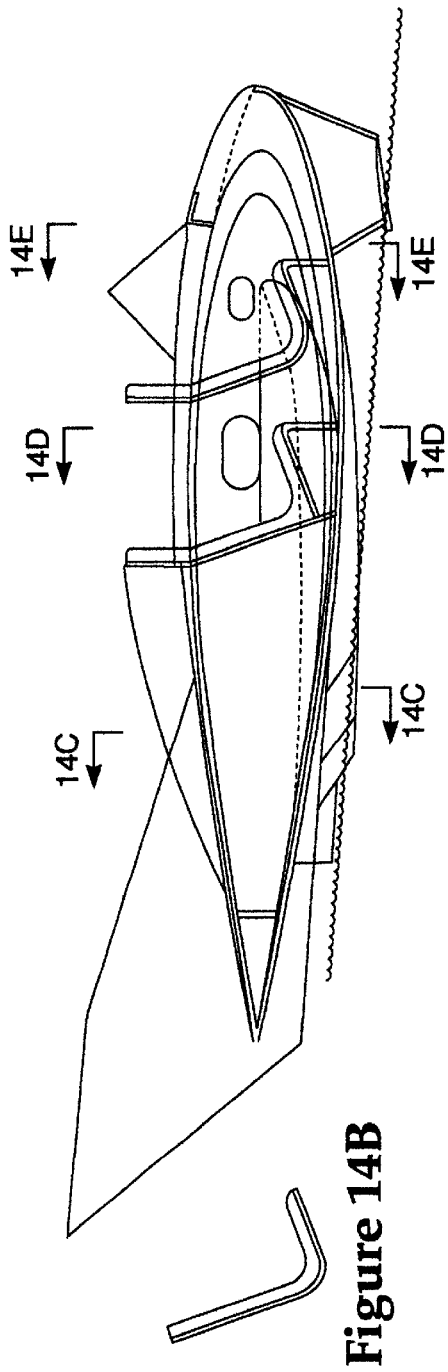
Figure 14
Figure 14B
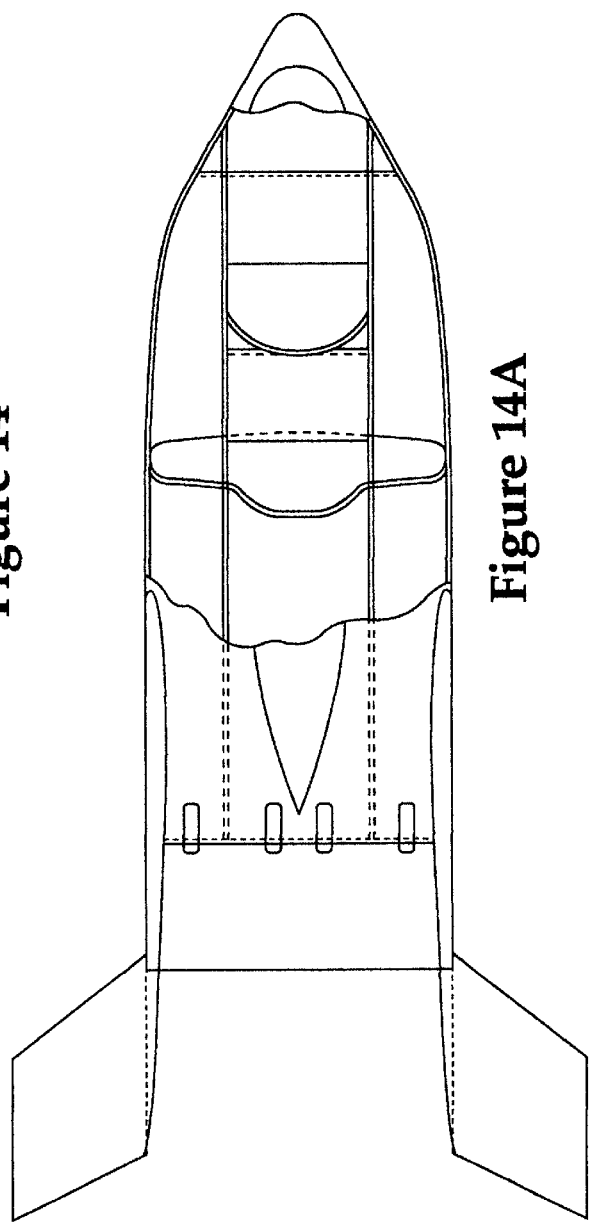
Figure 14A

Cruise

Take off

Fowler Flap

MULTIPLE-MODE WING-IN GROUND EFFECT VEHICLE

This application is a continuation-in-part of U.S. Application Ser. No. 08/802,774 filed Feb. 21, 1997, now U.S. Pat. No. 5,950,559 and U.S. Provisional Patent Application No. 60/012,222 filed Feb. 23, 1996, the entire disclosures of which are incorporated herein by reference.

BACKGROUND AND SUMMARY OF THE INVENTION

The invention relates in general to ground-effect vehicles, and in particular to high-speed vehicle capable of multiple mode operation as both a water-contacting vehicle and as an aircraft (e.g., a Wing-In Ground Effect vehicle).

The invention includes a high-speed air-supported vehicle capable of multiple mode operations as both a water-contacting vehicle and an aircraft includes an aero roll-stabilizing stabilizing plan form, a stabilizing ski/hydrofoil below a planing surface of a hull portion of the aero roll-stabilizing plan form for providing stabilization and lift to the plan form in at least one mode of operation, the ski/hydrofoil being mounted to a front underside of a hull portion of the aero roll-stabilizing plan form and being mounted forward of a center of gravity of the plan form, whereby a leading edge of said plan form is kept at a substantially constant level with respect to a surface of water during at least one mode of operation. A stabilizing ski provides stabilization and lift in at least one mode of operation. A flexible ski mount is provided for mounting the stabilizing ski to the aero roll stabilizing plan form. Trim flaps are provided for altering the direction of the plan form, and turning vanes are provided to reduce turbulence originating near the edge of the tip plates.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIGS. 14 and 14A through 14E show blue print views illustrating the invention according to a preferred embodiment.

DETAILED DESCRIPTION

Figure 1A:
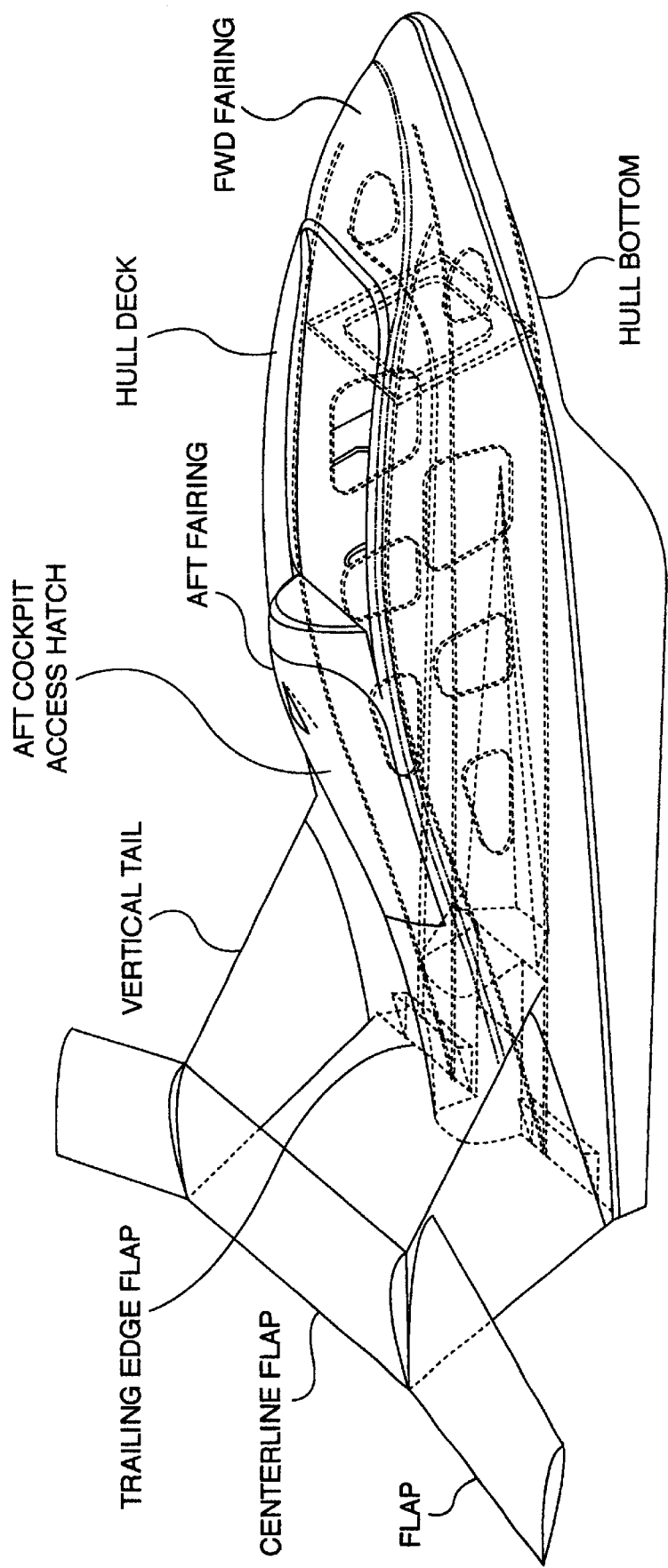
FIGS. 1a and 1b illustrate perspective views of the vehicle according to the invention.
Figure 1B:
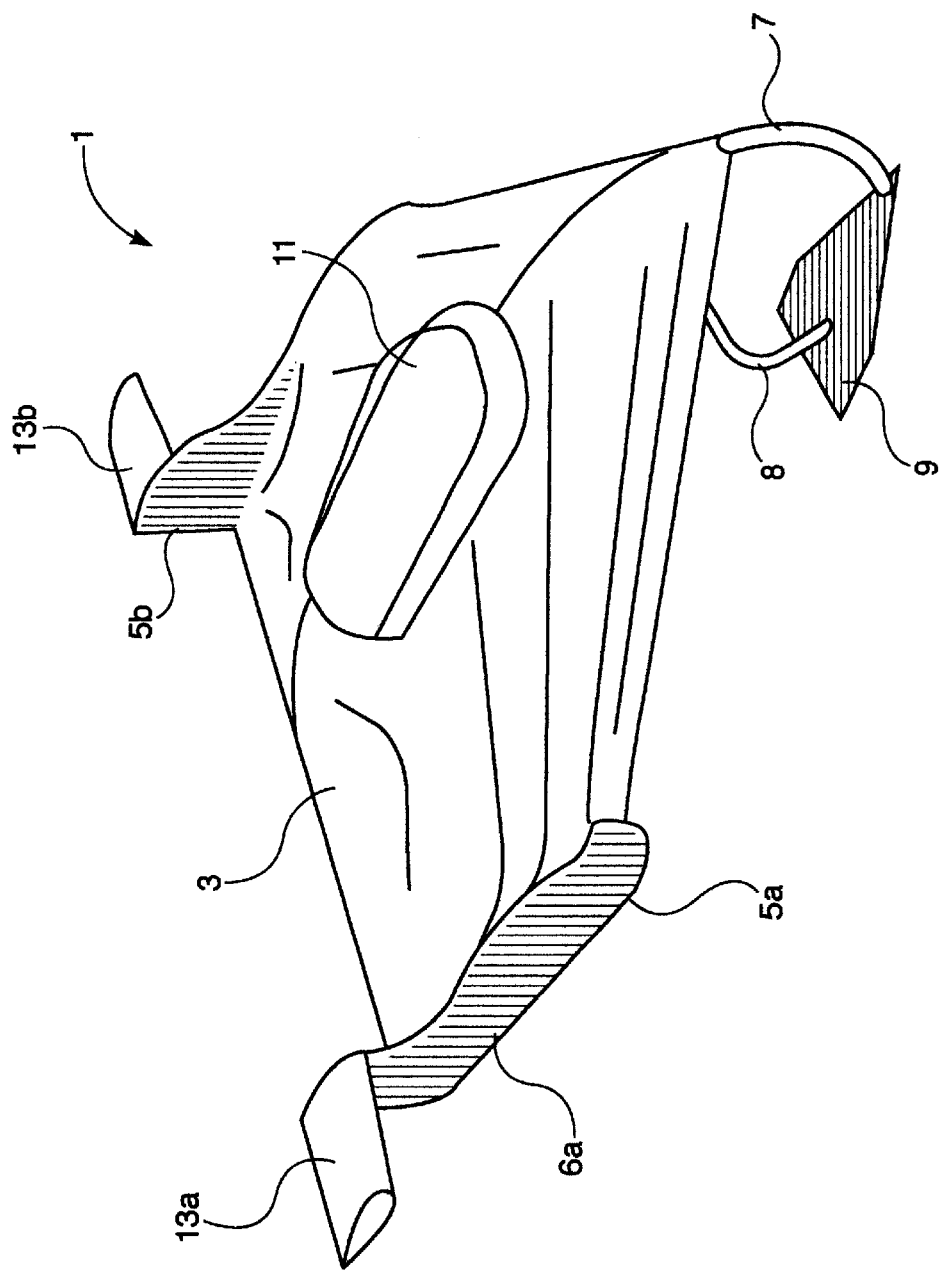

FIGS. 1a and 1b show perspective drawings illustrating the vehicle of the invention according to a preferred embodiment. An aero roll-stabilizing plan form 3 comprises sharply swept leading edges and low-aspect ratio. A turning vane 5a is provided on a bottom and front portion of each wing tip plate. A stabilizing ski 9 serves to provide stabilization and lift in certain modes of operation, which is discussed in more detail below. A further benefit of the ski is that it prevents the vehicle from taking-off when the vehicle is at rest or moving slowly in high winds. The stabilizing ski 9 has a non-snagging shape and is connected to the hull of the vehicle via a non-snagging, flexible ski mount 7, 8. The preferred embodiment can turn by dragging its tip plate in the water, which can cause yaw (that must be carefully controlled) and side force. The embodiment of FIGS. 1a and 1b preferably has high heave stiffness. Lift reduces rapidly as the tip plates rise above the water. This results in heave stiffness, a safety feature in that it assists in keeping the vehicle off the water, and is also a performance feature in that it keeps the vehicle's prop or jet intake in the water.

Figure 2:
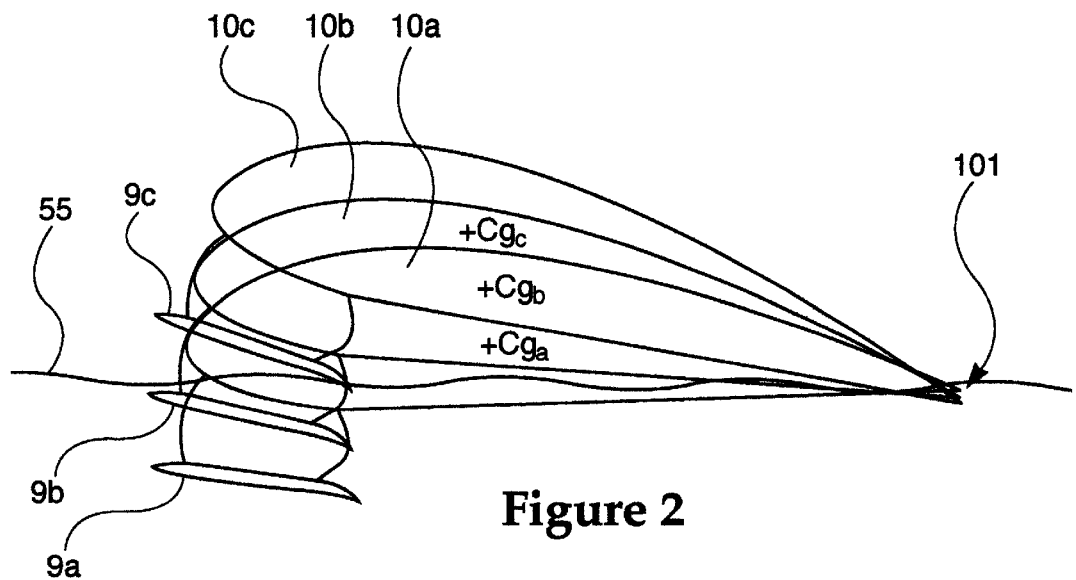
FIG. 2 shows a side view illustrating operation of the airfoil and stabilizing ski of the invention during three low-speed modes of operation.

FIG. 2 shows a side view illustrating operation of the airfoil, which includes "lifting body," and stabilizing ski 9 during three low-speed modes of operation. The airfoil is shown at 10a in a "displacement" mode, during which it is operating at a stand still or very low speed. In this mode, the hull of the vehicle is partially submerged below a water line 55. The ski 9a is fully submerged, and its flexible mount is at rest. During the displacement mode, the ski 9a provides little or no lift or stabilization.

The airfoil is shown at 10b in a hydrofoil/planing mode, wherein the airfoil has an upward angle of attack, with its bow portion being above the water line 55 and its stern portion being below the water line 55. During this mode, the ski 9b acts as a hydrofoil that provides some lift and reduces the wetted area of the hull. As shown in the drawing, the airfoil's changing angle of attack can be seen as a pivoting motion around a pivot point 101. That is, the stern portion of the airfoil preferably remains in the water as the vehicle moves through its low-speed modes of operation.

The airfoil is shown at 10c in a planing/planing mode, wherein the hull is planing with minimum wetted area. During both the hydrofoil/planing and the planing/planing modes, the primary benefit of the ski 9b, 9c is to provide reduced hull wetted area and increased angle of attack for more aero lift.

Figure 3:
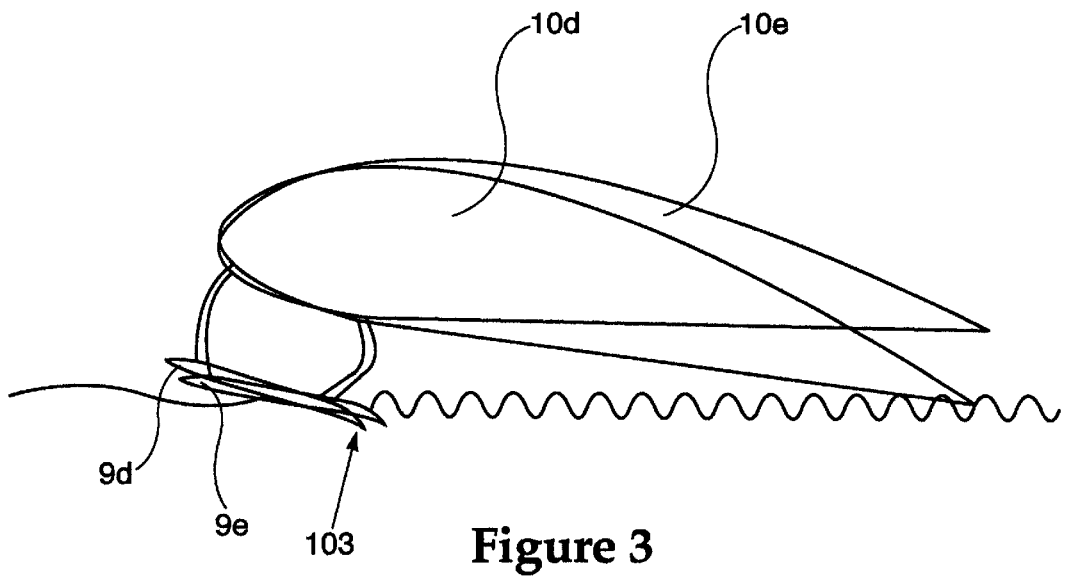
FIG. 3 shows a side view illustrating operation of the airfoil and stabilizing ski of the invention during two high-speed modes of operation.

FIG. 3 shows a side view illustrating operation of the airfoil and stabilizing ski 9 during two high-speed modes of operation, in which a large part of the lift is provided aerodynamically. The airfoil is shown at 10d in an air-lubricated mode, wherein significant amounts of air pass under the trailing edge (or transom) of the airfoil. From a low vantage point, the vehicle may appear to be "flying" but actually a significant amount of lift is provided by water contact with the ski and hull.

The airfoil is shown at 10e in a still-higher-speed mode of operation where the aero surfaces of the hull have lost contact with the water and the hull is truly flying. At these speeds (and higher), the primary function of the ski is to provide pitch stability. The center of gravity (CG) is placed well-ahead of the aerodynamic center of pressure of the vehicle, resulting in substantial static stability in flight. The resulting moment is "trimmed-out" by the ski, which is forward of the CG and lifts part of the weight of the vehicle. As speed increases, the vehicle has no tendency to lift entirely off the surface of flat water. Instead, the ski maintains contact and the hull lifts up slightly as is shown by 10e in comparison to 10d. As a result, venting areas under the trailing edge, and perhaps the tip plates [FIGS. 1b, 6a], become larger and the angle of attack becomes smaller. Both reduce the coefficient of lift sufficiently to keep total lift equal to weight.

The ski also plays an important safety role. One function is to protect the crucial center part of the hull from contact with waves or objects floating in the water. The ski contacts the object first, pushing it downward and raising the bow of the vehicle. This raising increases lift and subsequently raises the rest of the vehicle. A further safety function of the ski is that it allows the vehicle to be operated or anchored in a very high wind, even if wind speed is far above the normal takeoff speed. If the vehicle is anchored or moving slowly through the water, the ski will not lift the nose out of the water and the aero lift will be greatly reduced preventing take-off.

A forward ski that contacted the water in the event the plane was flown into the water at high speed was developed by Lockheed, but their ski was not effective at takeoff, did not trim the vehicle, and was and not normally in contact with the water. Instead, they had a much larger "ski" that was below the CG of the vehicle and acted as a retractable "step" as found on seaplanes.

Figure 4:
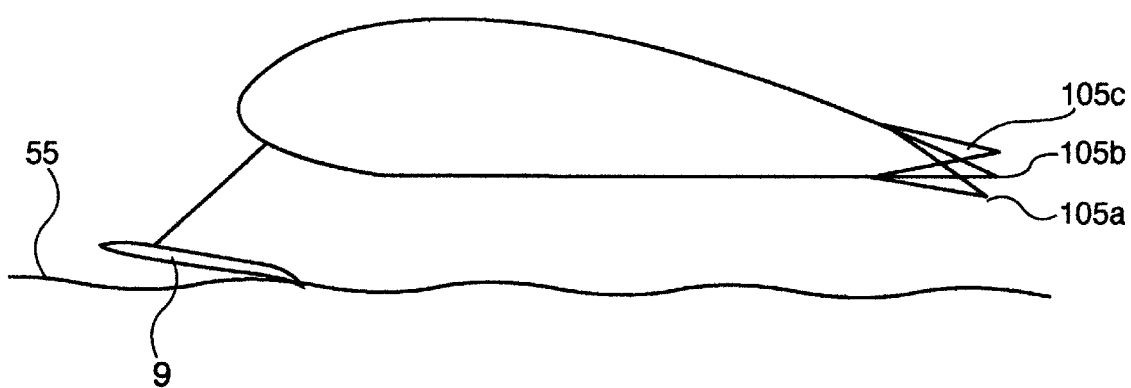
FIG 4 shows a side view illustrating means for aerodynamically trimming the vehicle of the invention.

FIG. 4 shows means for aerodynamically trimming the vehicle. In combination with the front ski, it makes it possible to maintain relatively constant ride height independent of speed. 105a shows "down" trim in the aircraft sense but, because of the ski and the forward CG, it increases weight on the ski and raises the hull, which is a benefit at certain speeds. 105c shows "up" trim in the aircraft sense but as long as the ski supports part of the weight of the vehicle it has the effect of lowering the hull and taking weight off of the ski, which is desirable at high speeds. When the speed and aero trim are sufficient, the ski lifts off the water and the vehicle becomes an aircraft that flies with stability in or out of ground effect. 105b shows neutral, or zero, trim.

Figure 5:
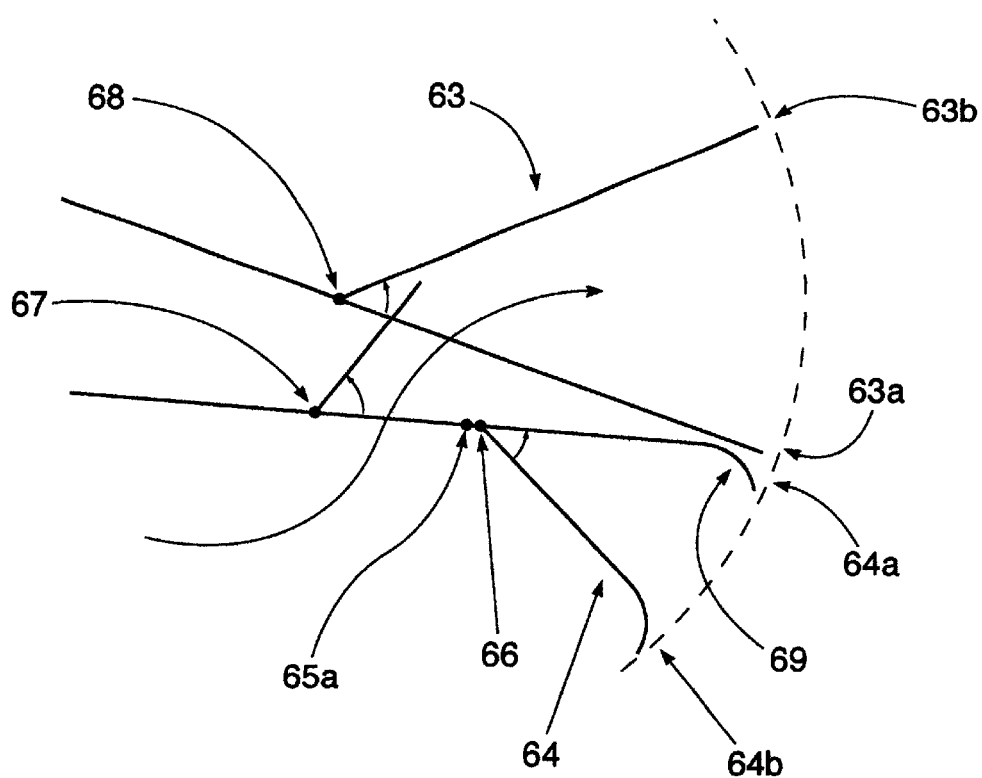
FIG. 5 shows the air/water brake of the invention in first and second modes of operation.

FIG. 5 shows the air/water brake in first and second modes. Each mode will now be described.

Mode I (simple). The upper trim flap 63 rotates about point 68 from position 63a to position 63b. The lower trim flap 64 rotates about point 66 from position 64a to position 64b. The geometry is selected to provide progressive amounts of aerodynamic drag while maintaining pitch control. Part of the vehicle may be put in contact (or increased contact) with the water to provide water drag.

Mode II (with vent). In Mode II, a vent is created between the high pressure area below the wing and the low pressure area above, beside, or behind the wing. This is accomplished either by the movement of the trim flaps 63 and 64, or by a vent 65, or both. The vent allows more aggressive use of the lower trim flap 64 and a more aggressive reduction in lift which results in increased water drag. The vent could in some cases, e.g., if the vents were at the sides, be used independently of the trim flaps. Various combinations are possible by using the flaps 63, 64 and the vent 65 either together or separately.

A common problem for WIGs is the tendency to pitch forward as the surface is approached, due, e.g., to a rearward shift in the center of pressure. Means have been provided in the prior art for counter-acting this tendency, but all have disadvantages. In the present invention, however, the plan form itself acts as a means to counter this tendency. FIG. 5 also shows a novel mechanism which may be provided for causing the center of pressure or lift to move forward as the surface of the water is approached by the vehicle. A small downward turn 69 of the lower surface 64 of the wing near its trailing edge can cause a forward shift as the surface is approached so that the vehicle noses up. This provides an additional means to avoid water contact.

Figure 6:
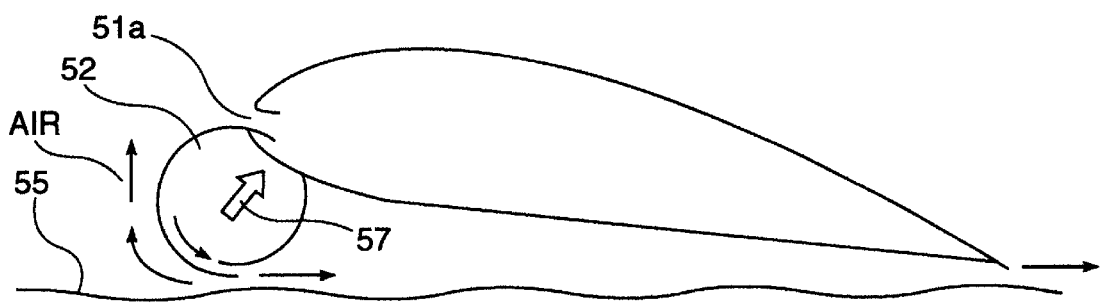
FIGS. 6–8 show side views illustrating an advanced Air-Cushion Landing System (ACLS) of the invention.
Figure 7:
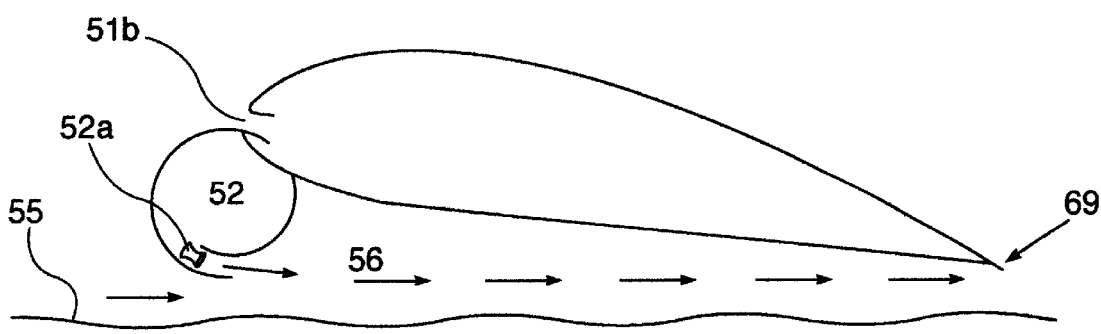
Figure 8:
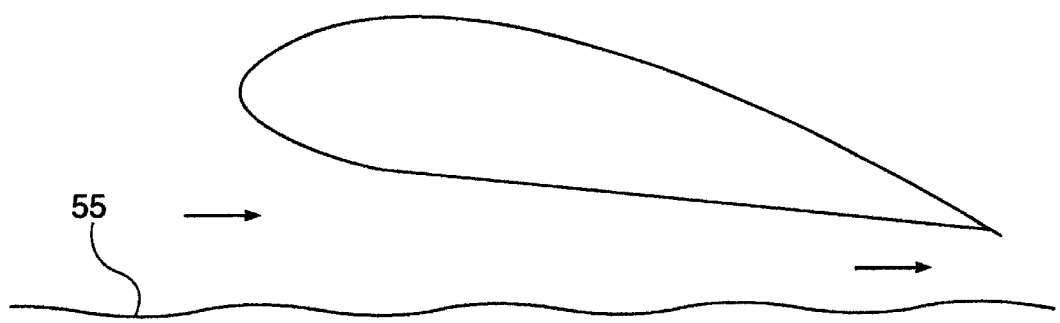
Figure 6A:
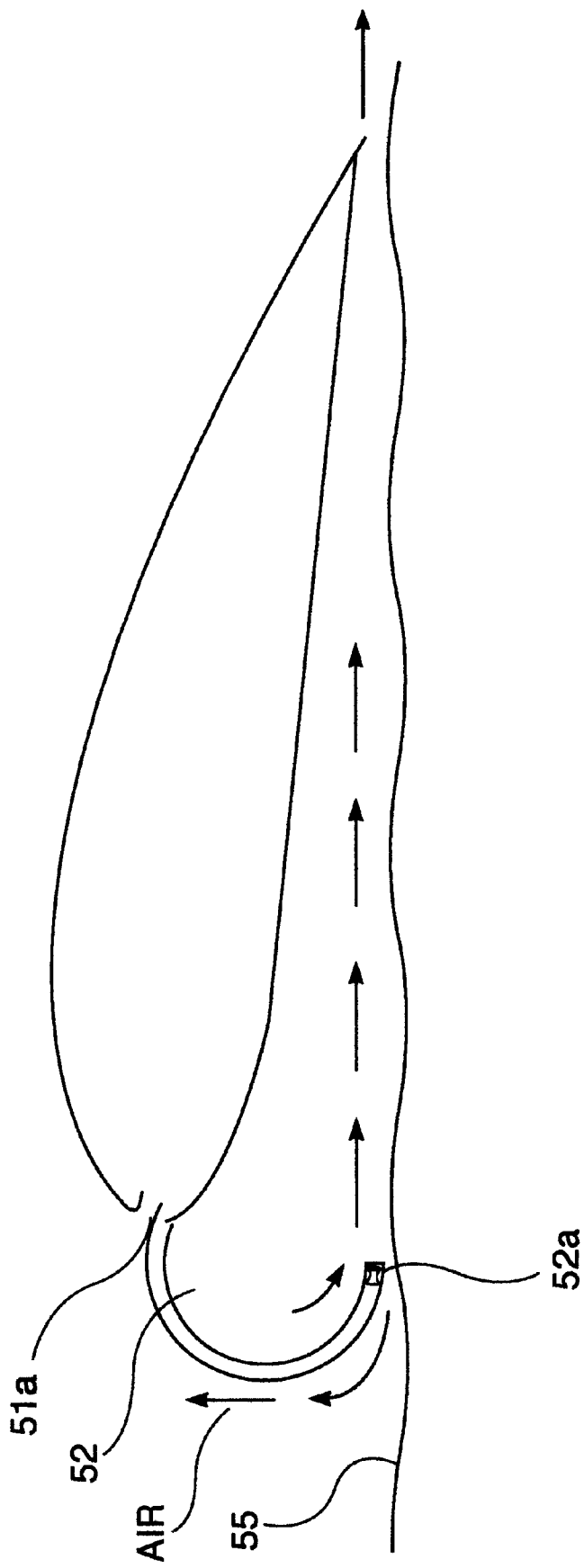

FIGS. 6–8 illustrate an advanced Air-Cushion-Landing-System (ACLS) that utilizes the underside of the wing for lift, is retractable, and increases the thickness, curvature and leading-edge radius of the wing. The benefit of this approach is less water drag on take off and more aero lift as compared to other ACLS's which are separate from the wing and are retractable or are permanently in a low-speed configuration. FIG. 6 shows the vehicle operating in air cushion mode. Air is blown into the cavity under the hull, lifting it clear of the water, in much the same manner as a hovercraft or surface-effect ship. Forward shift of the leading edge can reduce tuck under, which is a problem for hovercraft with forward CG. In the preferred embodiment, forward placement of a front seal 52, and the resulting force vector angle 57, reduces the risk of tuck under, which would otherwise be a problem due to the forward placement of the CG. At high hovercraft speeds where tuck under is a problem, the exposed upper surface of the seal will be pulled up by aero forces, also reducing tuck under. Aero lift can also be increased by the suction slot 51a. Also, as shown in FIG. 4, the trim can be raised from 105a to 105b or 105c to control tuck under. FIG. 6a shows an alternate front seal.

FIG. 7 shows the vehicle operating in low-speed W.I.G. mode. Leading edge radius can be very large. Thickness and camber can be increased. Cord can be increased. All are means to increase aero lift. Blowing from a jet 52a on the front seal 52 can also limit the increase in effective camber and further increase effective thickness by "filling in" the odd-shaped volume 56 behind the front seal. A suction slot 51a, 51b (FIGS. 6 and 7) runs near the leading edge and skims off the turbulent boundary layer. This is especially important in hovercraft mode where a considerable amount of low energy air escapes from under the front seal 52. Both the front seal and the suction slot increase aero lift, thereby lowering the speed at which the vehicle transitions from ACV to WIG mode and reducing the likelihood of stalling and reducing the force of wave impacts.

FIG. 8 shows the vehicle operating in high-speed W.I.G. mode with the front seal retracted.

Figure 9:
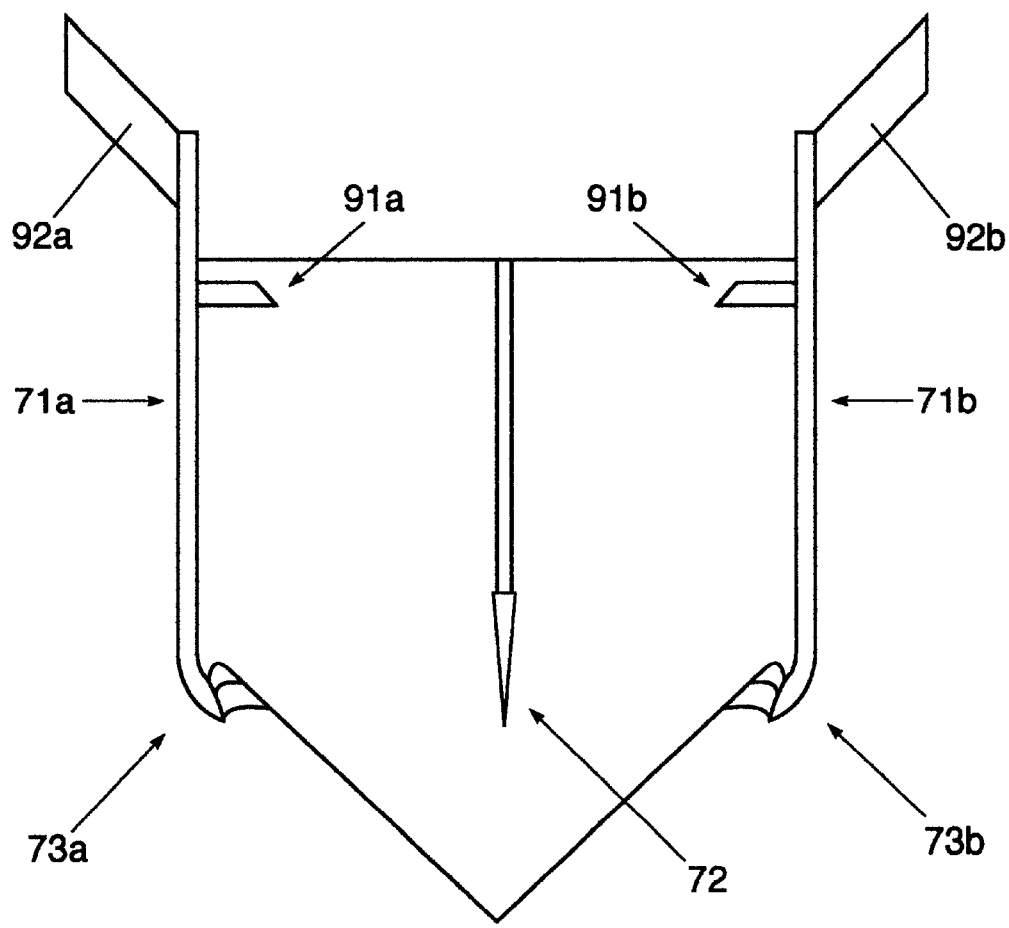
FIGS. 9 and 10 show bottom and front views, respectively, illustrating the turning vanes of the invention according to a preferred embodiment.
Figure 10:
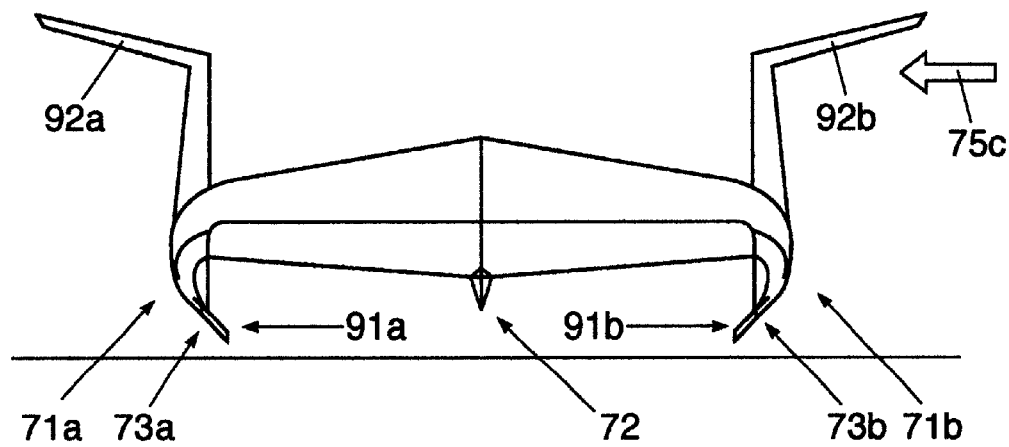
Figure 11A:
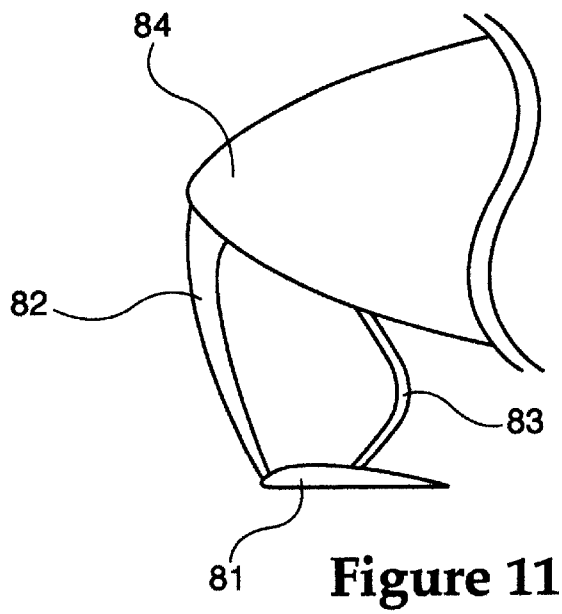
FIGS. 11a, 11b, 11c and 11d show side, front, bottom and profile views, respectively, of a non-snagging ski and ski mount of the invention.
Figure 11B:
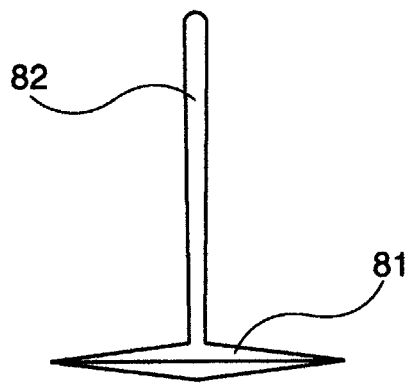
Figure 11C:
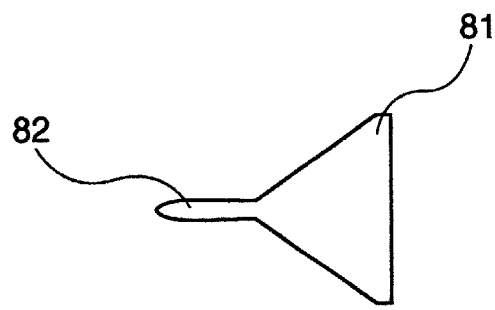
Figure 11D:
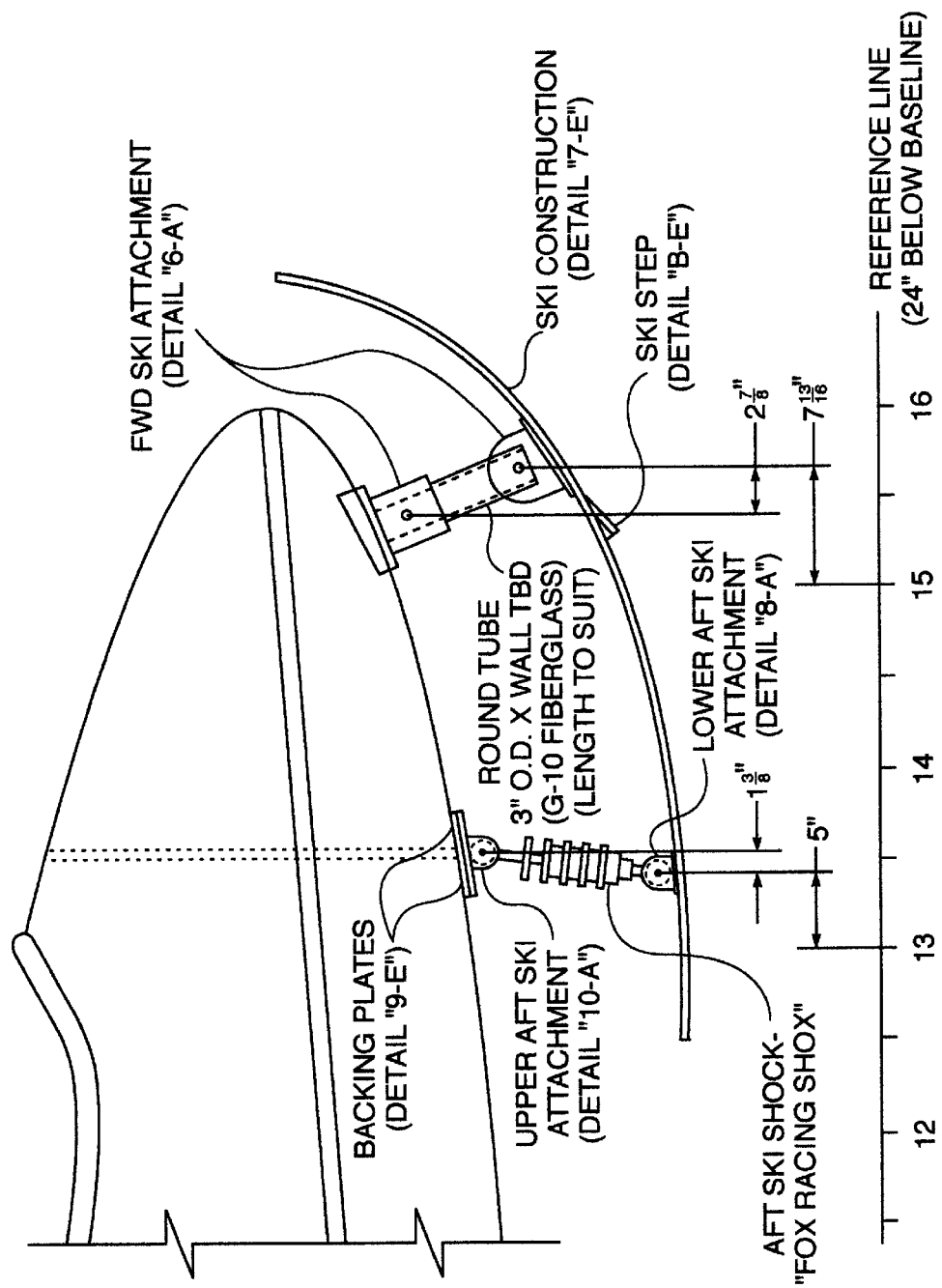

FIGS. 9 and 10 illustrate the turning vanes of the invention according to a preferred embodiment. The turning vanes 73a and 73b are relatively thin pieces of the forward or under edges of the tip plates 71a and 71b that are turned toward the direction that the wind approaches them in order to minimize turbulence. The turning vanes 73a and 73b can be shaped to contact the water in such a way as to direct resulting hydrodynamic forces in such a way as to eliminate inappropriate roll (tripping) or yaw (snagging).

Dihedral effect is so named because the effect on this vehicle is similar to the effect of dihedral on an airplace, e.g. yaw causes the vehicle to bank into a turn. It is an aerodynamic analog to the yaw-induced roll found in a v-bottom planing hull that results from hydro-dynamic forces. Yaw-induced roll, or in some cases the absence of yaw-induced adverse roll, is an important feature of high-speed water craft.

In part, dihedral effect here is caused by the swept-back leading edge of the hull. This is a well-known effect for airplane wings. The invention according to a preferred embodiment combines a sharp sweep angle with a separator 72 that divides the air flow beneath the hull into left and right channels to obtain the desired effect. It will be recognized by those skilled in the art that a third, center channel could also be established by providing a second separator. In such case, the leading edge need not be swept back in the center portion of the hull between the two separators.

Even though the separation is unlikely to be perfect (because air will pass under the separator), it greatly enhances the pressure differential under the up-wind side of the hull in comparison to the down-wind portion. The resulting roll couple prevents tripping even if the relevant, i.e., up wind, notrip (see notrips 73a and 73b, FIG. 10) is small and not generally in contact with the water.

FIGS. 11a, 11b, 11c and 11d show side, front, bottom and profile views, respectively, of a non-snagging ski plus mount that also flexes as a result of slamming (vertical) forces or impact (longitudinal) forces. It is comprised of a ski or hydrofoil 81 with a swept leading edge, a strong strut 82 that flexes somewhat under impact forces, and spring means 83 that can flex easily under slamming or impact loads. The leading edges of the entire assembly can be shaped to promote riding over or around obstacles without snagging on them, thereby minimizing impact forces and the likelihood of an unplanned stop. Flexing of the strut 82 further minimizes impact forces without resulting in adverse (negative) pitch changes to the ski. If desired, pitch change can be positive. Flexible spring means 83 reduce slamming loads in two ways: first, by yielding with the blow (ski moves upward), and second, by changing the angle of attack of the ski (reducing pitch) which reduces the lift of the ski. The slamming force is actually a sudden increase in lift as the ski or hull slams down on the water. Flexible spring means 83 also reduces impact loads by reducing angle of attack.

Figure 12:
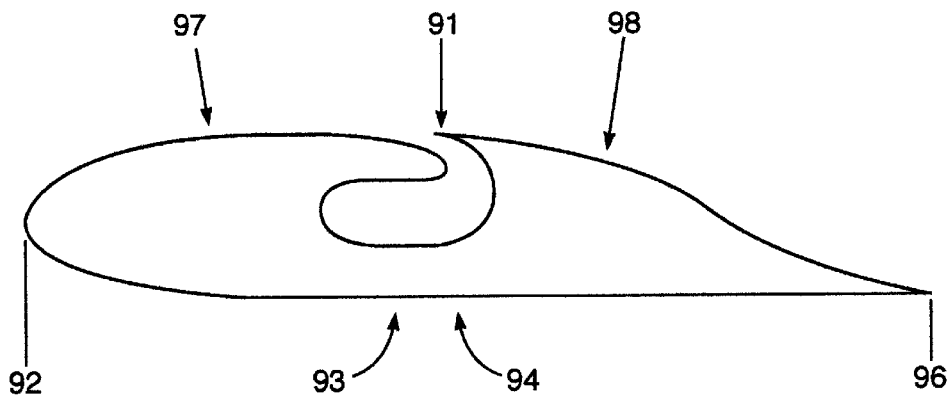
FIG. 12 shows a cross-sectional side view illustrating a novel suction slot means of the invention.
Figure 13:
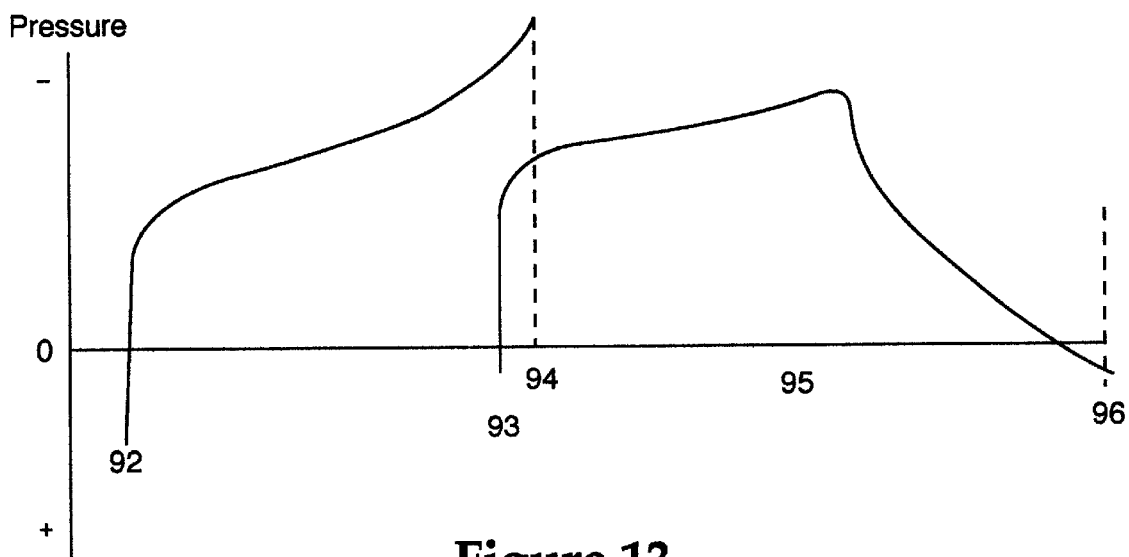
FIG. 13 show a pressure diagram of the top of the wing shown in FIG. 12.

FIGS. 12 and 13 illustrate a novel suction slot means for providing laminar flow over large bodies with high Reynolds Numbers. FIG. 12 shows a cross-sectional side view of a body with a suction slot, while FIG. 13 shows the pressure diagram of the top of the body. This concept may be applied to any large surface that is rapidly moving through air or other fluids. In FIG. 12, the suction slot invention is applied to the top side of an airplane wing or an airfoil-shaped vehicle. Two features should be noted. The first is a suction slot running across the flow of the fluid, e.g., transverse. The second feature is panels 97, 98 that produce a pressure diagram shown in FIG. 13 that rises continuously to a maximum negative pressure at station 94 as the surface of the front panel 97 disappears into the suction slot 91. In the preferred embodiment, the curve is concave upward so that the pressure gradient becomes more and more favorable as the air flows over the panel.

At station 94, the attachment point for the second panel 98, pressure is positive but quickly becomes negative and rises to a maximum at station 95. Regions between 92 and 94 on the first panel 97 and between 93 and 95 on the second panel 98 may have laminar flow at very high Reynolds numbers. The region between 95 and 96 is a recovery zone of turbulent flow. At still higher Reynolds numbers, multiple slots may be required.

Figure 14C:
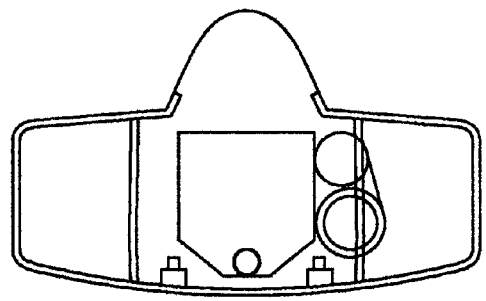
Figure 14D:
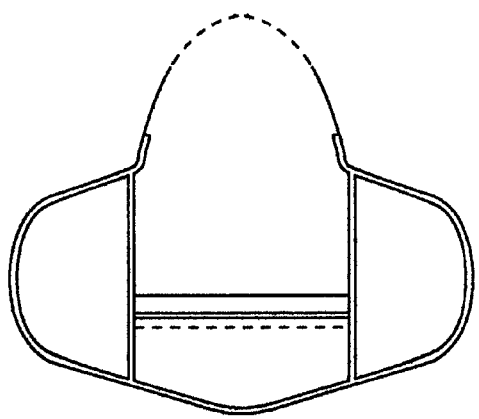
Figure 14E:
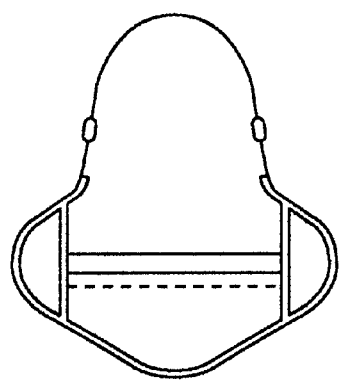

FIG. 14 shows a two-dimensional CAD blue print showing certain features of an embodiment of the invention.

Figure 15:
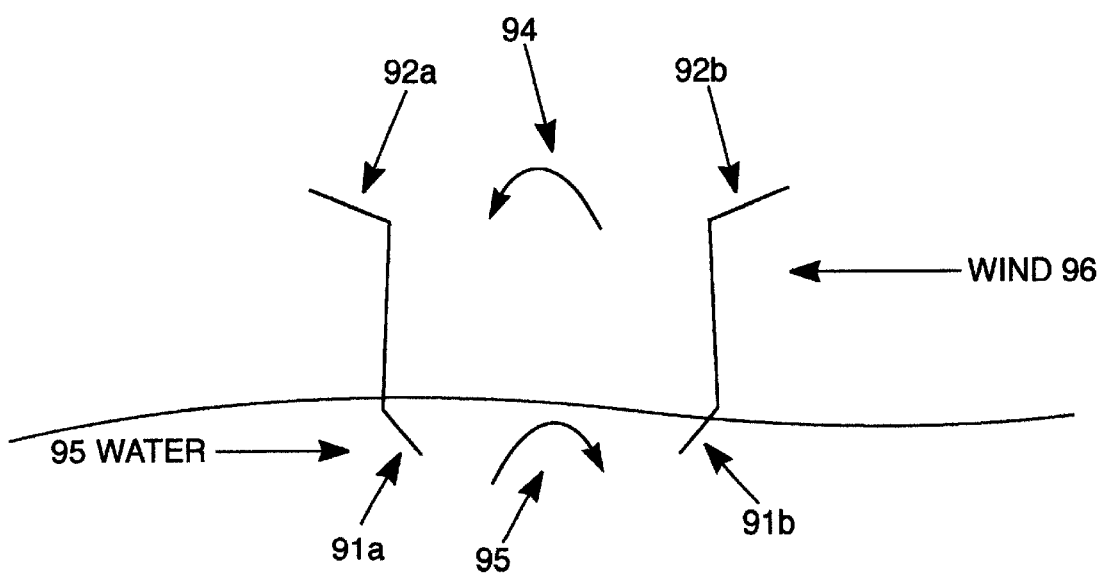
FIG. 15 shows a front view illustrating an alternative means for canceling couples.

FIG. 15 illustrates an aft-view showing certain features of an embodiment of the invention. If the water fins 91a and 91b and air fins 92a and 92b are configured as shown, the vehicle can be set up so that, at high speeds, cross winds will cause neither yaw nor roll. A pair of water fins 91a and 91b are provided on the underside of the hull and a pair of air fins 92a and 92b are provided on the top side of the hull. See also FIGS. 9 and 10. When the vehicle is yawed relative to the air and water, these provide additional roll moment and lift. Both reduce the risk of tripping. In cross winds, a common problem for W.I.G., aero and hydro yaw are in opposite directions. The resulting force vector 95 and 96 and roll moments 93 and 94 can cancel one another. Combining these features causes the vehicle to be relatively unaffected by cross winds. Lift is generally increased, but this effect can be controlled. FIG. 15 shows an example in which the cross-wind on the aerofins 92 and the height difference between 95 and 96 results in roll-couple to the left whereas the resulting side force against the water results in a countering roll couple of similar magnitude. When added together, the two sum to approximately zero and there is little or no tendency to roll. A similar approach can also cancel yaw moments. Yaw is controllable by the fore-aft placement of the air and water centers of pressure.

Several alternative embodiments of the invention are specifically contemplated. The vehicle of the invention may have soft skirts provided around all sides of the hull's lower portion to create an amphibious boat. The vehicle of the invention may have a much larger overall width than shown here; if such an embodiment includes an aircraft-type means for propulsion, it could fly out of ground effect efficiently for extended periods of time. In one preferred embodiment much of the added width is in the horizontal tails.

Figure 16:
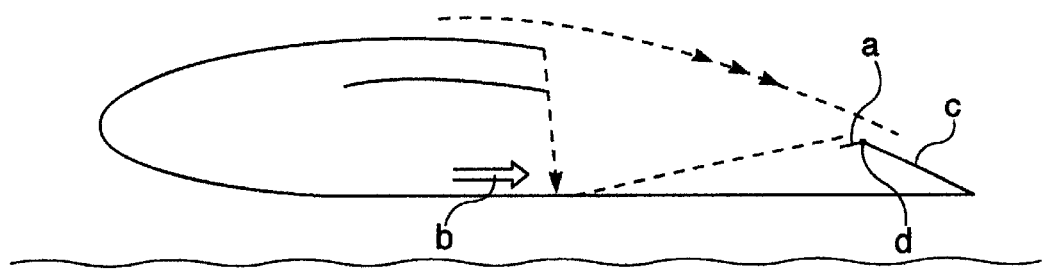
FIGS. 16 and 17 show cross-sections of alternate aircraft carrier embodiments of the invention.

FIG. 16 illustrates an aircraft carrier embodiment of the invention. Air flow is indicated by a dotted line. An air intake a is opened via a pivot d. A blower b blows air counter to the natural back flow. A blowing slot c is provided for re-attaching the boundary layer. In this embodiment, most of the lift is maintained, extra drag is minimized, and wind is minimized in the cavity/slot c.

Figure 17:
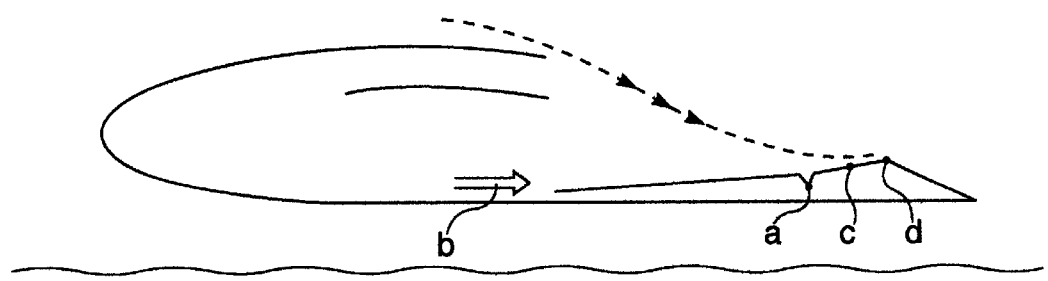

FIG. 17 illustrates a second aircraft carrier embodiment. Air flow re-attaches forward of the pivot d to provide a relatively flat surface from d to b with relatively undisturbed air, flow over part of it so that a plane or other aircraft can alight while maintaining air flow over its wings and other important surfaces.

Figure 18:
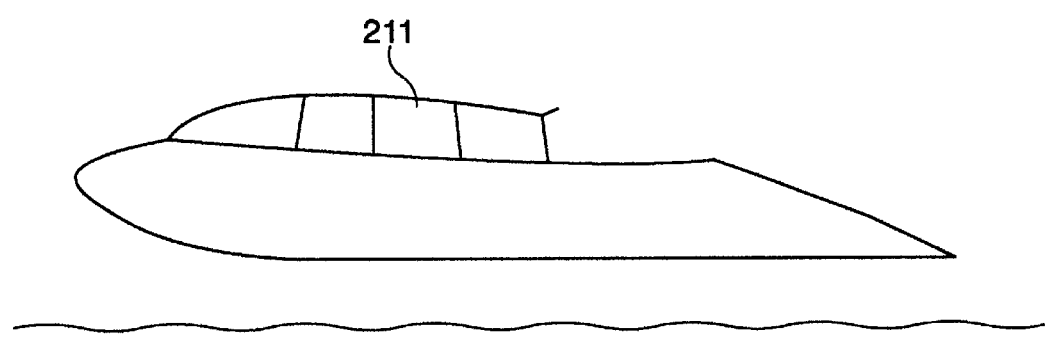
FIG. 18 shows a pleasure boat embodiment of the invention.

FIG. 18 illustrates a pleasure craft embodiment of the invention. This embodiment comprises a boat or WIG that utilizes its upper surface for lift and has a large opening to create an open top or convertible effect. This embodiment may include various features described above with respect to other embodiments. Blowing and/or suction may be provided to minimize noise and buffeting inside the boat and to raise the maximum open top speed.

Figure 19:
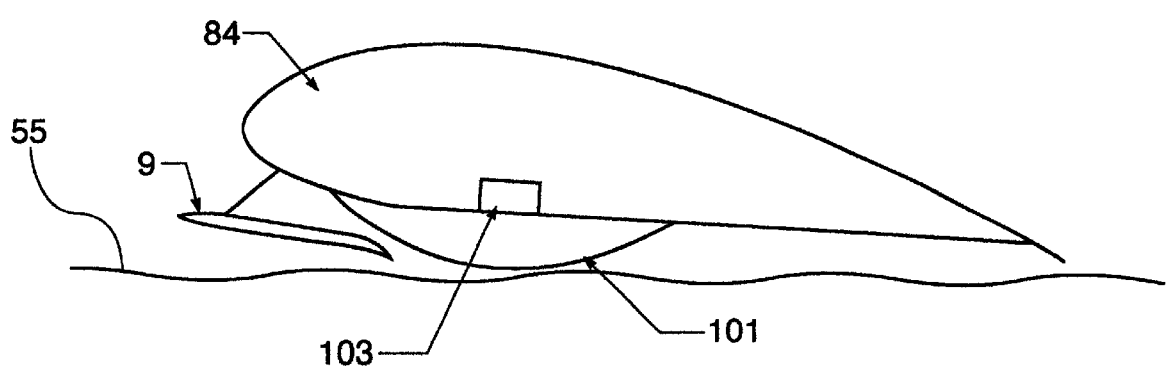
FIG. 19 shows an improved air/water brake according to an embodiment of the invention.

FIG. 19 illustrates an improved air/water brake according to an embodiment of the invention. A flexible membrane 101 is mounted on the underside of the hull 84 of a wing-in-ground-effect vehicle. In normal WIG-mode operation the membrane 101 is deflated and is flush with the underside of the hull 84. When braking is desired during WIG mode, the membrane 101 may be moved into position by a suitable means, shown in block form at 103, such that the membrane 101 extends below the lower surface of the ski/hydrofoil 9, as shown. Means 103 may comprise, e.g., a pump or a lever. This creates a venturi effect whereby the hull 84 is pulled into contact with the water surface 55. Once in contact with the water surface, the inefficient shape of the hull 84 and membrane 101 produces downthrust (suction) which further lowers the vehicle, producing further drag.

Figure 20:
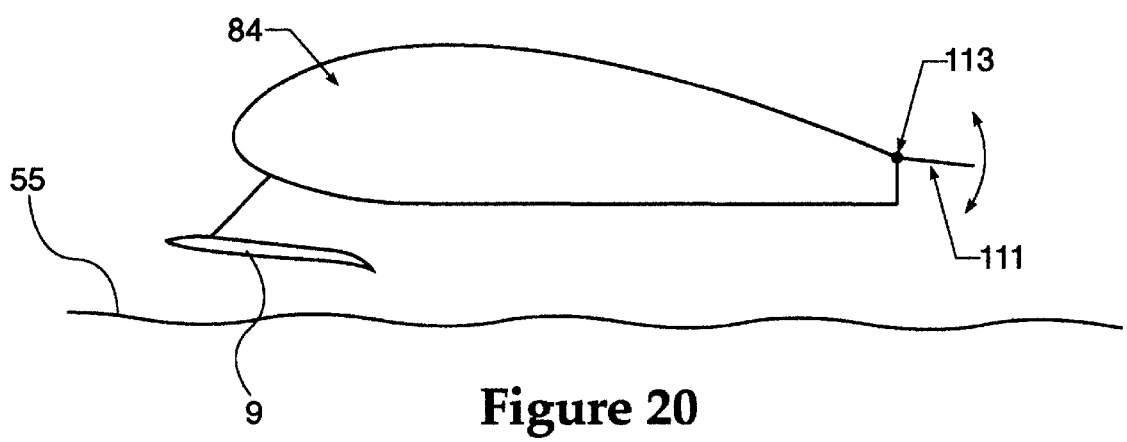
FIG. 20 illustrates an alternate embodiment of the invention as illustrated in FIG. 4.

FIG. 20 illustrates an alternate embodiment of the invention as illustrated in FIG. 4. Left and right upper trim flaps 111 provide a trim, turn, and brake means. The upper trim flaps 111 pivots about pivot points 113 at or near the upper transom of the hull 84 of an air-supported vehicle. Turning may be effected by, e.g., raising the left trim flap and lowering the right trim flap, thereby banking the vehicle, until the left tip plate contacts the water. This water contact causes a yawing movement of the hull and provides the side force necessary to turn.

Figure 21A:
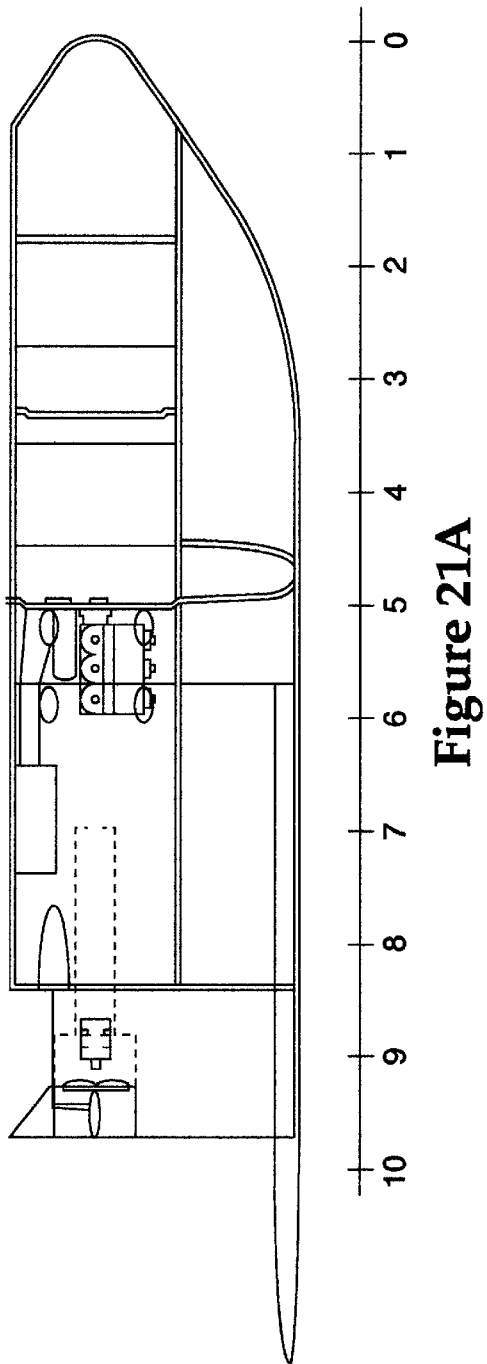
FIGS. 21a and 21b illustrate further detailed top and profile views of the inboard profile shown in FIG. 14.
Figure 21B:
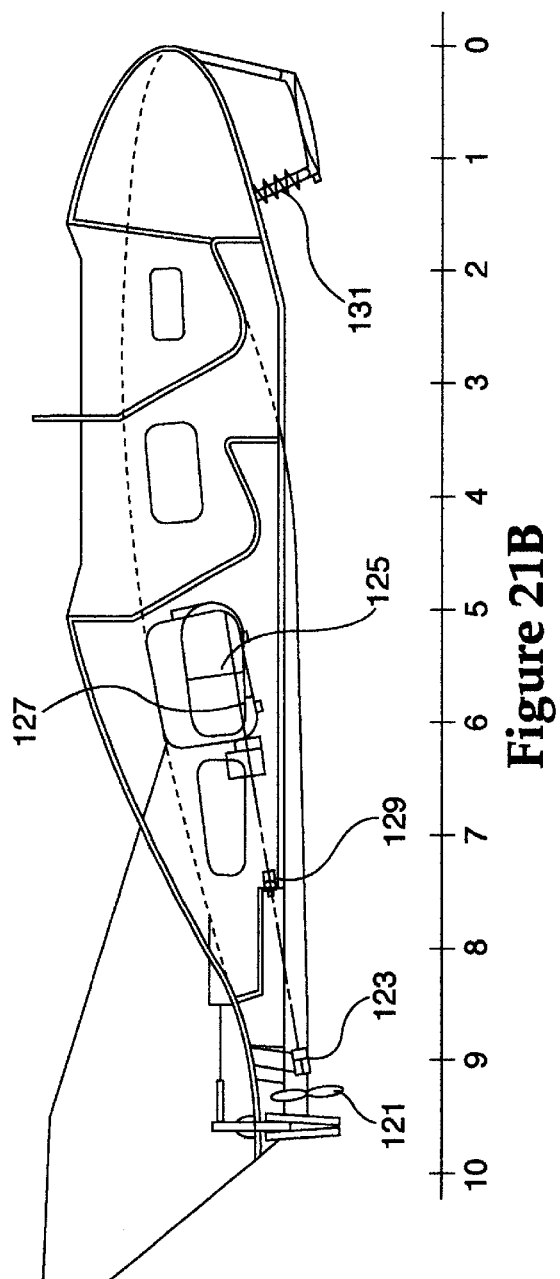

FIGS. 21a and 21b illustrate further detailed top and profile views of the inboard profile shown in FIG. 14. A coil/shock 131 is provided for permitting pivoting of the ski/hydrofoil, whereby the ski/hydrofoil is flexibly mounted to the hull. Appropriate propeller 121, strut 123, and engine mounts 127 may be provided. An engine 125 with an appropriate reduction gear (e.g., 1.66:1) may be provided. A high-speed dripless shaft seal, as shown at 129, may further be provided.

Figure 22:
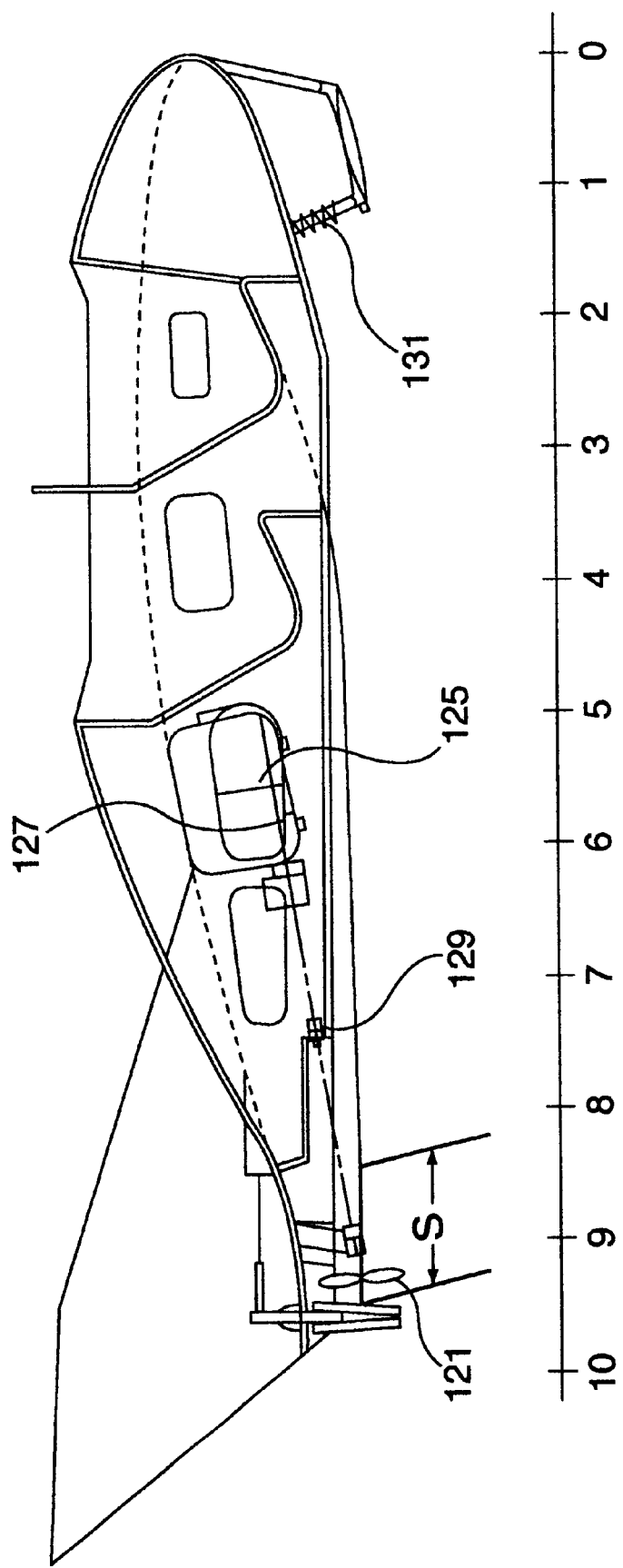
FIG. 22 shows a profile view illustrating a trimming device for ground effects vehicles in accordance with a further embodiment of the invention.

FIG. 22 shows a profile view illustrating a trimming device for ground effects vehicles in accordance with a further embodiment of the invention. The trimming device preferably comprises a planing surface S which provides increased aerodynamic stability for ground-effects machines (e.g., WIGs) by applying a small trimming moment. When a WIG becomes airborne, e.g., as a result of wave contact, to be safe it must have little or no tendency to blow over (nose up until it is upside-down) or nose dive into the water. Instead, it should maintain its angle of attack or increase it until a stable glide attitude is established. As a result, alighting on the water is gentle and is made at a favorable angle of attack. The trimming device of the invention provides a tool which to help achieve that goal. This trimming device is applicable to WIGs of any type, but preferably is applied to WIGs which are aerodynamically stable in pitch.

The trimming device of the invention in its preferred embodiment comprises a small planing surface or hydrofoil mounted aft of a craft's center of gravity. It is designed to contact the water while the vehicle is being operated in ground effect so as to provide lift that is well aft of the CG, thereby trimming the bow down. The bow down hydrodynamic trim allows the aerodynamic trim to be bow up. Therefore, when the vehicle becomes totally airborne, it is already trimmed properly and little or no driver-intervention is required.

In the preferred embodiment, the trimming device of the invention is applied to a ground effects machine that utilizes a water propulsion system and a front-mounted stabilizing ski. The combination of a planing surface in front and a smaller planing surface in the rear can provide better control over pitch and heave than a fully flying WIG or a conventional boat. As a result, passengers can experience a better ride and the water propulsion system will remain effective in higher waves.

Figure 23:
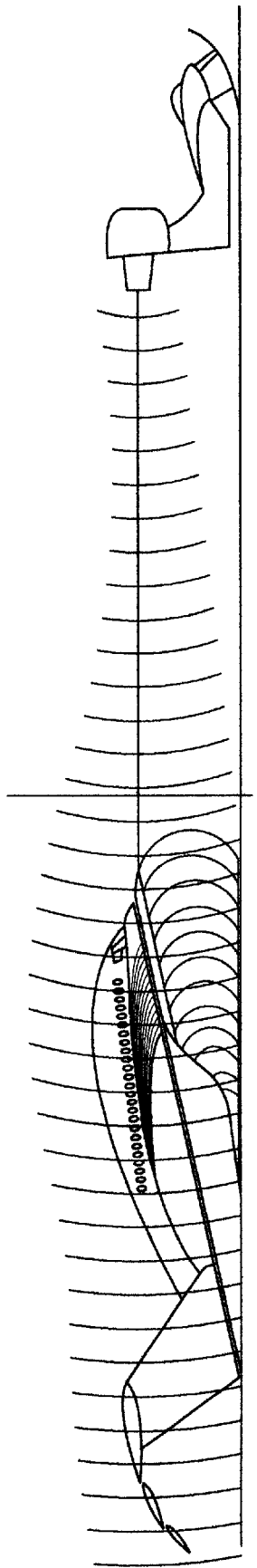
FIG. 23 shows a profile view illustrating a WIG launching system in accordance with a further embodiment of the invention.

FIG. 23 shows a profile view illustrating a WIG launching system in accordance with a further embodiment of the invention. The WIG launching system in its preferred embodiment includes three elements; first, a small high-speed vehicle powered by large jet engines; second, a detachable towing cable; and third, a WIG that lacks sufficient power to take off on its own.

The exhaust from the launcher's jets spreads out and merges into one blast of high-velocity air that completely engulfs the WIG to be launched. The high-velocity of the air blast over the WIG's lifting surfaces increases lift. The increased lift, combined with the towing force on the cable, makes it possible for the heavily loaded WIG to take off. The WIG launching system of the invention provides the ability for a WIG to carry a larger payload, and permits WIGs to utilize smaller, less-expensive engines. The launching system of the invention further provides WIGS with the capability to achieve higher cruising speeds as a result of higher wing loading. The WIG launching system of the invention further can provide the advantage of better fuel-economy by permitting WIGs to operate with higher wing loadings and smaller engines.

Figure 24A:
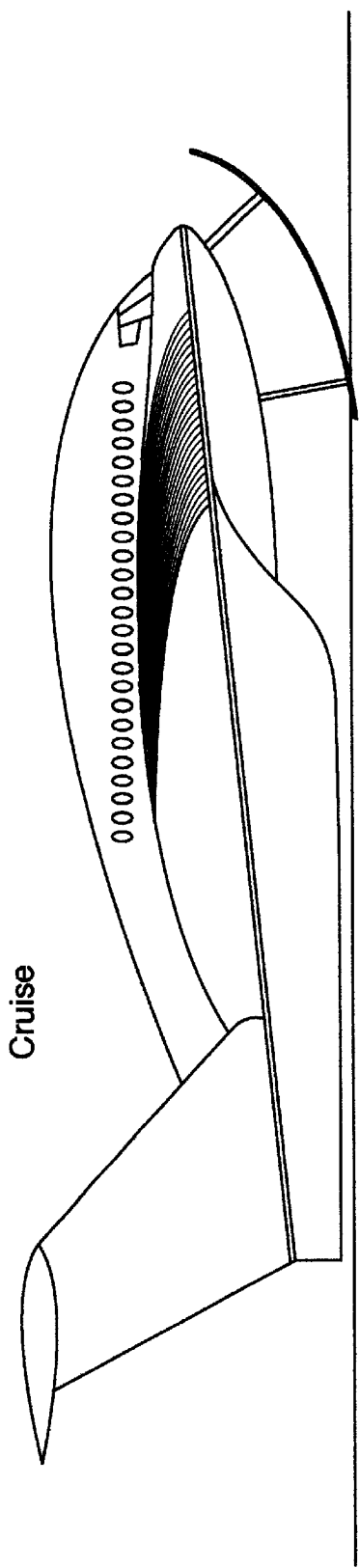
FIGS 24a and 24b show a profile view illustrating cruise and takeoff modes in accordance with an embodiment of the invention.
Figure 24B:
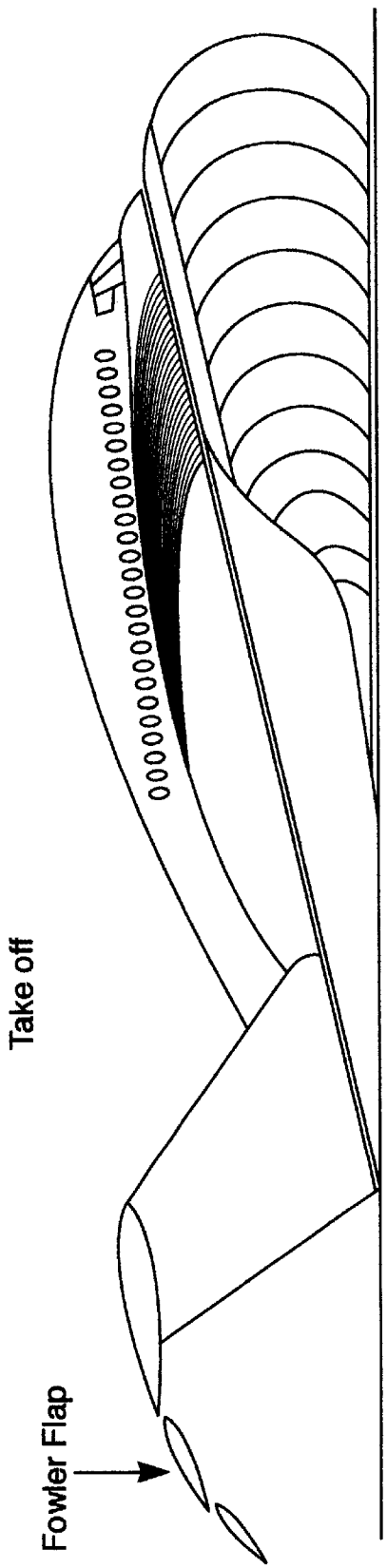

FIGS. 24a and 24b show a profile view illustrating cruise and takeoff modes in accordance with an embodiment of the invention. FIG. 24a shows a vehicle of the invention in a cruise mode wherein a Fowler flap (not visible) is in a retracted position and an air cushion landing system (not visible) is in a retracted position. FIG. 24b shows a vehicle of the invention in a take-off mode wherein a conventional Fowler flap 201 is in a deployed position and an air cushion landing system is in a deployed position. In addition to providing additional lift, the added cord of the Fowler flap shifts the aerodynamic center of the vehicle aft, offsetting the forward shift caused by the air-cushion landing system.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A high-speed air-supported vehicle having an air cushion landing system, comprising:

airfoil means for producing lift;

front seal means forming a leading edge of at least a portion of said airfoil and lifting body means;

means for blowing air into a cavity behind said front seal means; and, suction slot for skimming off a turbulent boundary layer of air.

2. A high-speed air-supported vehicle having an air cushion landing system, comprising:

airfoil means for producing lift;

front seal means forming a leading edge of at least a portion of said airfoil and lifting body means, wherein said front seal comprises an exposed upper seal surface; and, means for blowing air into a cavity behind said front seal means.

3. A high-speed air-supported vehicle having an air cushion landing system, comprising:

airfoil means for producing lift;

front seal means forming a leading edge of at least a portion of said airfoil and lifting body means;

means for blowing air into a cavity behind said front seal means; and, a suction slot near a leading edge of said airfoil and extending transverse to a flow of air therepast.

4. A high-speed air-supported vehicle having an air cushion landing system, comprising:

airfoil means for producing lift;

front seal means forming a leading edge of at least a portion of said airfoil and lifting body means; and, means for blowing air into a cavity behind said front seal means, wherein said means for blowing air is located near the lowest portion of said seal and faces aft, whereby said means for blowing air fills in said cavity.

5. A high-speed wing-in-ground-effect vehicle which is resistant to yaw and roll caused by cross-winds when said vehicle is operated at high speeds, comprising:

a body portion;

first and second air fins extending upwardly and outwardly from said body portion;

first and second water fins extending downwardly and inwardly from said body portion.

6. A convertible vehicle, comprising:

a hull comprising an upper surface which includes a convertible top that is movable to expose a compartment;

said hull being shaped such that an airflow reattaches at an aft end of said compartment so as to prevent turbulence and loss of lift, said hull being shaped such that said airflow remains attached when said compartment is exposed and said vehicle is operating at high speeds.

7. The convertible vehicle according to claim 6, wherein said compartment comprises a flat surface of dimensions suitable for receiving an aircraft.

8. The convertible vehicle according to claim 6, wherein said hull comprises a wing-in-ground-effect vehicle hull.

* * * * *